US010659494B2

(12) United States Patent
Lu et al.

(10) Patent No.: US 10,659,494 B2
(45) Date of Patent: May 19, 2020

(54) METHOD FOR IMPLEMENTING ONLINE ANTI-PHISHING

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 334 days.

(21) Appl. No.: 15/502,797

(22) PCT Filed: Aug. 21, 2015

(86) PCT No.: PCT/CN2015/087742
§ 371 (c)(1),
(2) Date: Feb. 9, 2017

(87) PCT Pub. No.: WO2016/034048
PCT Pub. Date: Mar. 10, 2016

(65) Prior Publication Data
US 2017/0237775 A1   Aug. 17, 2017

(30) Foreign Application Priority Data

Sep. 3, 2014   (CN) .......................... 2014 1 0446939

(51) Int. Cl.
*H01L 29/06*   (2006.01)
*H01L 29/08*   (2006.01)
(Continued)

(52) U.S. Cl.
CPC ........ *H04L 63/1483* (2013.01); *H04L 63/101* (2013.01); *H04L 67/02* (2013.01); *H04L 67/146* (2013.01); *H04L 63/168* (2013.01)

(58) Field of Classification Search
CPC . H04L 63/101; H04L 63/1483; H04L 63/168; H04L 67/146; H04L 67/02
(Continued)

(56) References Cited

U.S. PATENT DOCUMENTS 8,381,292 B1   2/2013   Warner et al.
8,468,597 B1 *  6/2013   Warner ................. G06Q 10/10
                                                      705/50
(Continued)

OTHER PUBLICATIONS

2009 International Conference on CyberWorlds Modelling Intelligent Phishing Detection System for e-Banking using Fuzzy Data Mining Maher Aburrous, M. A. Hossain, Keshav Dahal, Fadi Thabatah (Year: 2009).*

(Continued)

*Primary Examiner* — Kambiz Zand
*Assistant Examiner* — Benjamin A Kaplan
(74) *Attorney, Agent, or Firm* — Hammer & Associates, P.C.

(57) ABSTRACT

A method for implementing online anti-phishing, related to the field of information security, comprising: a browser loads an online anti-phishing control, the control acquires a blacklist and a whitelist, if a received URL of the browser is in the blacklist, the browser is stopped from loading, if the URL is in the whitelist, the browser is notified to load, and if the URL is neither in the blacklist nor in the whitelist, a determination is made on whether or not the URL of the browser satisfies a preset fuzzy match criterion, if same is satisfied, then a user is prompted of danger, when the user chooses to proceed, a preset account combination is acquired, when received keypress information is numerals and an input focus is an input box control, the keypress information is compared with the preset account combination, if both are identical then the user is prompted of danger, and either stop or load as chosen by the user. The method allows processing of the blacklist and the whitelist to be implemented and addition of fuzzy query, thus implementing processing of the blacklist and the whitelist, preventing a hacker from stealing banking information of the user by using a fraudulent URL identical to one in the whitelist, and enhancing security.

15 Claims, 5 Drawing Sheets

(51) Int. Cl.
*H04L 29/06* (2006.01)
*H04L 29/08* (2006.01)

(58) Field of Classification Search
USPC .............................................................. 726/4
See application file for complete search history.

(56) References Cited

U.S. PATENT DOCUMENTS

2013/0124285 A1* 5/2013 Pravetz .................. G06Q 10/00
705/14.23
2014/0047518 A1* 2/2014 Pravetz ................... G06F 21/36
726/5
2015/0128205 A1* 5/2015 Mahaffey ................ H04L 63/20
726/1

OTHER PUBLICATIONS

Expert Systems with Applications 38 (2011) 12018-12027 An efficient phishing webpage detector Mingxing He a, Shi-Jinn Horng a,b,c,⇑, Pingzhi Fan c, Muhammad Khurram Khan d, Ray-Shine Run e, Jui-Lin Lai e, Rong-Jian Chen e, Adi Sutanto (Year: 2011).*

* cited by examiner

METHOD FOR IMPLEMENTING ONLINE ANTI-PHISHING

FIELD OF THE INVENTION

The present invention relates to a method for realizing anti-phishing in internet, which belongs to the field of information security.

PRIOR ART

E-bank assistant is a software which is developed so as to invoke and download, in the form of software of embedded programming or by using a program, the software which is adapted for e-banks and certificates on the basis of an install software of widget automation, which is used by certificate drive of each manufacture, CSP software, E-bank and certificates, and related patches of Microsoft.

An E-bank assistant integrates a drive of certificate, a CSP software, a widget and Microsoft-related patches of each manufacturer, the software will lead a user to install after the E-bank is downloaded and run by the user. The E-bank searches operating system of the computer, the drive of certificate and CSP according to a voucher number of U-key entered by the user, and the drive of certificate, the CSP and E-bank widgets are downloaded and installed step by step, and the user is prompted to download and install operating system patches, and to change a browser, such as Internet Explorer (IE), settings. By the method, users just need one software tool for integration instead of downloading multiple software, thus, U-key is more usable.

Phishing is an internet fraud, which means criminals swindle personal information, such as account numbers and passwords of banks or credit cards, by counterfeiting an Uniform Resource Locator (URL) address and content of its web page or by inserting dangerous Hyper Text Markup Language (HTML) code in some web pages on a website by using bugs of sever program in a real website.

In prior art, an anti-phishing widget is not safe enough, because the widget determines whether the conduct is a phishing through a black list and a white list sent by a sever, in this way, the widget cannot discriminate URL outside the black list or the white list, and via this bug, hackers will steal bank information of users.

SUMMARY OF THE INVENTION

The object of the present invention is to provide a method for realizing anti-phishing in internet, which can manage black and white lists and add fuzzy query to protect the bank information of users from being stolen by counterfeiting URL similar to URL in the white list; thus, the method is more secure.

Thus, the present invention provides a method for realizing anti-phishing in internet, which includes: starting a browser such as an IE and loading an anti-phishing widget, in which the anti-phishing widget executes following steps:

Step S1, obtaining, by the anti-phishing widget, a black list and a white list;

Step S2, waiting, by the anti-phishing widget, for receiving URL visited or accessed by the IE, and determining the URL visited by the IE, preventing the IE from loading the URL visited by the IE and returning to Step S2 in the case that the URL visited by the IE is in the black list; prompting the IE to loading the URL visited by the IE and returning to S2 in the case that the URL visited by the IE is in the white list; executing Step S3 in the case that the URL visited by the IE is neither in the black list nor in the white list;

Step S3, determining, by the anti-phishing widget, whether the URL visited by the IE and the URL in the white list meet a preset vague match condition, if yes, executing Step S4; otherwise, informing the IE to load the URL visited by the IE, and returning to Step S2;

Step S4, prompting, by the anti-phishing widget, that a user is conducting a dangerous operation, checking whether the user continues the operation, if yes, informing the IE to load the URL visited by the IE, and executing Step S5; otherwise, preventing the IF from loading the URL visited by the IE, and returning to Step S2;

Step S5, obtaining, by the anti-phishing widget, a preset account combination corresponding to URL, with which, the URL visited by the IE meets the preset vague match condition;

Step S6, waiting, by the anti-phishing widget, for receiving information of key entered by the user, when the information of key is entered by the users, determining whether the key is a number key, if yes, executing Step S7; otherwise, continuing to execute Step S6;

Step S7, determining, by the anti-phishing widget, whether an input focus is an input widget, if yes, executing Step S8; otherwise, returning to Step S6;

Step S8, obtaining, by the anti-phishing widget, the information of key entered by the user from the input widget, and determining whether the information of key conforms to the preset account combination, if yes, executing Step S9; otherwise, returning to Step S6; and Step S9, prompting, by the anti-phishing widget, that the user is conducting a dangerous operation, and checking whether the user continues the operation, if yes, informing the IE to jump to a user access interface, and returning to Step S2; otherwise, preventing the IE from loading the user access interface, and returning to Step S2.

Preferably, Step S1 specifically includes: the anti-phishing widget reading an install path from a registry, and obtaining the black list, the white list and the preset account combination from the install path, and saving them.

Preferably, Step S1 further includes:

Step a1, determining, by the anti-phishing, whether any black list, white list and preset account combination exist under the install path, if yes, obtaining the black list, the white list and the preset account combination from the install path and saving them, and executing Step S2; otherwise, executing Step a2; and Step a2, informing, by the anti-phishing widget, a back-end service of E-bank assistant to download a black list, a white list and a preset account combination from a sever, and saving the black list, the white list and the preset account combination under the install path, and executing Step S2.

Preferably, Step a1 further may be: determining, by the anti-phishing widget, whether the black list, the white list and the preset account combination under the install path need to be updated, if yes, executing Step a2; otherwise, obtaining the black list, the white list and the preset account combination from the install path, and saving them, and executing Step S2.

Preferably, Step a1 further may be: determining, by the anti-phishing widget, whether the black list, the white list and the preset account combination under the install path are interpolated, if yes, executing Step a2; otherwise, obtaining the black list, the white list and the preset account combination from the install path and saving them, and executing Step S2.

Preferably, Step a2 specifically includes:

Step b1, informing, by the anti-phishing widget, the back-end service of E-bank assistant to download the black list, the white list and the preset account combination from the sever;

Step b2, notifying, by the back-end service of E-bank assistant, the sever to download the black list, the white list and the preset account combination after a notice for downloading sent by the anti-phishing widget is received by the back-end service of E-bank assistant;

Step b3, obtaining, by the sever, an encrypted black list, an encrypted white list and an encrypted preset account combination after the notice for downloading sent by the back-end service of E-bank assistant is received by the sever, and sending them to the back-end service of E-bank assistant;

Step b4, sending, by the back-end service of E-bank assistant, the encrypted black list, the encrypted white list and the encrypted preset account combination to the anti-phishing widget;

Step b5, performing, by the anti-phishing widget, a preset decryption on the encrypted black list, the encrypted white list and the encrypted preset account combination after the encrypted black list, the encrypted white list and the encrypted preset account combination are received by the anti-phishing widget to obtain decrypted data;

Step b6, cutting out, by the anti-phishing widget, a preset length of data from the decrypted data and making the preset length of data as a first digest value, and performing a digest algorithm on the other data in the decrypted data to generate a second digest value;

Step b7, determining, by the anti-phishing widget, whether the first digest value equals the second digest value, if yes, saving the encrypted black list, the encrypted white list and the encrypted preset account combination under the install path, and executing Step S2; otherwise, executing Step b8; and Step b8, determining, by the anti-phishing widget, whether the notice for downloading is sent for preset times, if yes, ending the process; otherwise, executing Step b1;

obtaining the black list, the white list and the preset account combination from the install path and saving them, specifically is: obtaining the encrypted black list, the encrypted white list and the encrypted preset account combination from the install path, decrypting the encrypted black list, the encrypted white list and the encrypted preset account combination to obtain the black list, the white list and the preset account combination, and saving them.

Preferably, Step S1 specifically includes: obtaining, by the anti-phishing widget, a general black list, a general white list, a customized white list and a customized black list corresponding to information of each bank;

Step S2 specifically includes: the anti-phishing widget waiting for receiving the URL visited by the IE, and determining the URL visited by the IE, preventing the IE from loading the URL visited by the IE in the case that the URL visited by the IE is in the general black list or in the customized black list corresponding to information of each bank, and returning to Step S2; informing the IE to load the URL visited by the IE in the case that the URL visited by the IE is in the general white list or in the customized white list corresponding to the information of each bank, and returning to Step S2; otherwise, executing Step S3;

in Step S4, after informing the IE to download the URL, the preset vague match condition, and determining the URL; obtaining a preset account combination corresponding to information of all banks in the case that the URL is in the general white list, and executing Step S6; executing Step S5 in the case that the URL is in the customized white list corresponding to the information of each bank; and Step S5 specifically includes: the anti-phishing widget obtaining the bank information corresponding to the URL in the white list, with which, the URL visited by the IE meets the preset vague match condition, from a memory, and obtaining the preset account combination corresponding to the bank information.

Preferably, Step S1 specifically includes: the anti-phishing widget obtaining the customized white list and the customized black list;

Step S2 specifically includes: the anti-phishing widget waiting for receiving the URL visited by the IE and determining the URL, preventing the IE from loading the URL visited by the IE in the case that the URL visited by the IE is in the customized black list, and returning to Step S2; informing the IE to load the URL visited by the IE in the case that the URL visited by the IE is in the customized white list, and returning to Step S2; otherwise, executing Step S3; and Specifically, Step S5 comprises that the anti-phishing widget obtaining the bank information corresponding to the URL in the customized white list, with which, the URL visited by the IE meets the preset vague match condition, and obtaining a preset account combination corresponding to the bank information.

Preferably, preventing the IE from loading the URL visited by the IE specifically includes: the anti-phishing widget turning down a label page corresponding to the URL visited by the IE or setting the label page corresponding to the URL visited by the IE as a blank page.

Preferably, Step S6 specifically is: determining whether a difference of characters between the URL visited by the IE and the URL in the white list is not lager than a preset difference, if yes, the URL visited by the IE and the URL in white list meet the preset vague match condition, and executing Step S4; otherwise, the URL visited by the IE and the URL in white list do not meet the preset vague match condition, informing the IE to load the URL visited by the IE, and returning to Step S2.

Preferably, determining whether the difference of characters between the URL visited by the IE and the URL in the white list is not greater than the preset difference, specifically includes:

Step 1, obtaining, by the anti-phishing widget, unprocessed URL from the white list, and making the unprocessed URL as current URL;

Step 2, obtaining, by the anti-phishing widget, a first character string length of the current URL and a second character string length of the URL visited by the IF, and determining whether a difference between the first character string length and the second character string length is greater than the preset difference, if yes, executing Step 4; otherwise, executing Step 3;

Step 3, determining, by the anti-phishing widget, whether the difference of characters between the URL visited by the IE and the current URL is not greater than the preset difference, if yes, the URL visited by the IE and the URL in the white list meet the preset vague match condition, and executing Step S4; otherwise, executing Step 4; and Step 4, determining, by the anti-phishing widget, whether any unprocessed URL exists in the white list, if yes, executing Step 1; otherwise, the URL visited by the IE does not meet the preset vague match condition, informing the IE to load the URL visited by the IE, and returning to Step S2.

Preferably, Step 3 specifically includes:

Step c1, constructing, by the anti-phishing widget, a matrix, of which all matrix element values are 0, a linage of the matrix is the first character string length plus 1, a column number of the matrix is the second character string length plus 1; initializing the matrix element values corresponding to the first line of the matrix as values from 0 to the first character string length, and initializing the matrix element values corresponding to the first column as values from 0 to the second character string length;

Step c2, obtaining, by the anti-phishing widget, a current line and a current column which are not updated from the matrix, and obtaining corresponding characters of the current line in the current URL according to the current line, and obtaining corresponding characters of the current column in the current URL according to the current column;

Step c3, determining, by the anti-phishing widget, whether the characters of the current line is same as the characters of the current column, if yes, setting an add value as 0, and executing Step c4; otherwise, setting the add value as 1 and executing Step c4;

Step c4, adding, by the anti-phishing widget, 1 to the matrix element value corresponding to the current line plus 1 and the current column to obtain a first numerical value, adding 1 to the matrix element value corresponding to the current line and the current column minus 1 to obtain a second numerical value, and calculating an add value of the matrix element value corresponding to the current line minus 1 and the current column minus 1 to obtain a third numerical value;

Step c5, updating, by the anti-phishing widget, the matrix element value corresponding the current line and the current column according to a minimum value of the first numerical value, the second numerical value and the third numerical value;

Step c6, determining, by the anti-phishing widget, whether any matrix element value which is not updated exists, if yes, returning to execute Step c4; otherwise, executing Step c7; and Step c7, obtaining, by the anti-phishing widget, the matrix element value corresponding to the linage, which is the first character string length plus 1, and the column, which is the second character string plus 1, and determining whether the matrix element value is smaller than or equals the preset difference, if yes, the URL visited by the IE meets the preset vague match condition, and executing Step S4; otherwise, executing Step 4.

Preferably, after preventing the IE from loading the URL visited by the IE, the method further includes: the anti-phishing widget saving the URL visited by the IE into the black list, informing the back-end service of e-bank assistant to send the URL visited by the IE to the sever, and the sever manually checks the number of the URL visited by the IE after a preset duration, the URL visited by the IE are saved into the encrypted black list and the encrypted white list in the sever when the number of URL visited by the IE reaches a preset value.

Preferably, in Step S4, after prompting that the user is operating a dangerous operation, the method further includes: determining whether any user's choice is detected in a preset duration, if yes, checking whether the user continues the operation; otherwise, preventing the IE from loading the URL visited by the IF, and returning to Step S2; and in Step S9, prompting that the user is conducting a dangerous operation, and checking whether the user continues the operation further includes: determining whether a user's choice is detected in a preset duration, if yes, checking whether the user continue the operation; otherwise, preventing the IE from loading a user access interface, and returning to Step S2.

Preferably, when the input focus is the input widget in Step S7, the method further includes: determining, by the anti-phishing, whether the input widget is an input-password widget, if yes, returning to execute Step S6; otherwise, executing Step S8.

According to the present invention, the method can not only process the black list and the white list, but also process the URL which is not in the black list and the white list by a vague inquire, in this way, the method can prevent hackers from stealing bank information of users by using URL which is similar to the white list, thus, the method is more secure.

BRIEF DESCRIPTION OF THE DRAWINGS

The Embodiments of the present invention are further described more clearly and completely with the drawing of the present invention. Obviously, Embodiments described here are just a few Embodiments of the present invention, when it comes to those skilled in the art, other drawings can be obtained without inventive work.

DETAILED DESCRIPTION OF THE INVENTION

The technical solution in the Embodiments of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
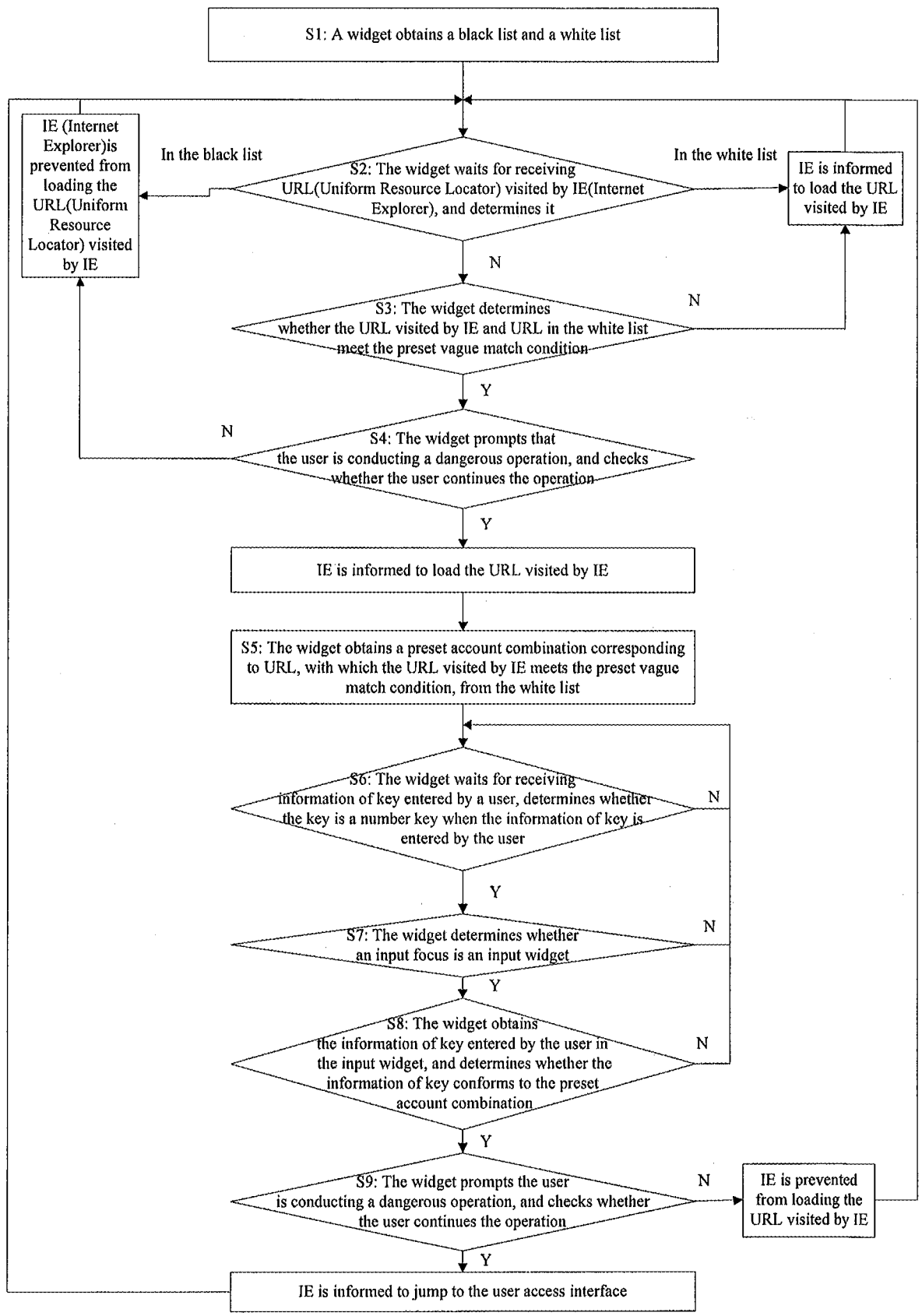
FIG. 1 illustrates a flow chart of a method for realizing anti-phishing in internet according to Embodiment 1 of the present invention.

The present invention provides a method for realizing anti-phishing in internet, as shown in FIG. 1, which includes: a browser, such as an IE, is started, an anti-phishing widget is loaded, and the anti-phishing widget (hereinafter anti-phishing widget is called widget for short) executes following steps:

Step S1, a black list and a white list are obtained by the widget;

specifically, an install path is obtained from a registry, and the black list and the white list are obtained from the install path;

moreover, Step S1 may specifically includes: the install path is obtained from the registry, an encrypted black list and an encrypted white list are obtained from the install path, the encrypted black list and the encrypted white list are decrypted to obtain the black list and the white list, and the black list and the white list are saved;

in which, if the black list and the white list under the install path include information of multiple banks, obtaining the black list and the white list specifically includes: a general black list, a general white list, and a customized black list and a customized white list, both of which correspond to information of each bank, are obtained;

if the black list and the white list under the install path just include information of specific bank, obtaining the black list and the white list specifically includes: a customized black list and a customized white list which correspond to the information of the specific bank are obtained;

Step S2, the widget waits for receiving URL visited or accessed by the IF, determines the URL visited by the IE, the IE is prevented from loading the URL visited by the IE and Step S2 is returned to in the case that the URL visited by the IE is in the black list; the IE is informed to load the URL visited by the IE and Step S2 is returned to in the case that the URL visited by the IE is in the white list; otherwise, Step S3 is executed;

in which, in the case that the black list and the white list under the install path include information of multiple banks, the IE is prevented from loading the URL visited by the IE if the URL visited by the IE is in the general black list or in the customized black list corresponding to information of each bank; the IE is informed to load the URL visited by the IE if the URL visited by the IE is in the general white list or in the customized white list corresponding to information of each bank;

in the case that the black list and the white list under the install path just include information of specific bank, the IE is prevented from loading the URL visited by the IE if the URL visited by the IE is in the customized black list corresponding to the information of specific bank; the IE is informed to load the URL visited by the IE if the URL visited by the IE is in the customized white list corresponding to the information of specific bank;

Step S3, the widget determines whether the URL visited by the IE and URL in the white list meet a preset vague match condition, if yes, Step S4 is executed; otherwise, the IE is informed to load the URL visited by the IE, and Step S2 is returned to;

in which, in the case that the black list and the white list under the install path include information of multiple banks, determining whether the URL visited by the IE and the URL in the white list meet the preset vague match condition specifically includes: determine whether the URL visited by the IE and the URL in the white list or the URL in the customized white list corresponding to information of each bank meet the preset vague match condition;

in the case that the black list and the white list under the install path just include information of specific bank, determining whether the URL visited by the IE and the URL in the white list meet the preset vague match condition specifically includes: determine whether the URL visited by the IE and the URL in the customized white list corresponding to the bank information meet the preset vague match condition;

Step S4, the widget prompts that the user is conducting a dangerous operation, checks whether the user continues the operation, if yes, inform the IE to load the URL visited by the IE and execute Step S5; otherwise, prevent the IE from loading the URL visited by the IE and return to Step S2;

Step S5, the widget obtains a preset account combination corresponding to the URL, with which, the URL visited by the IE meets the preset vague match condition, from the white list;

in which, in the case that the black list and the white list under the install path include information of multiple banks, Step S5 specifically includes: bank information corresponding to the URL, with which, the URL visited by the IE meets the preset vague match condition, is obtained from the white list, and the preset account combination corresponding to the bank information is obtained;

in the case that the black list and the white list under the install path just include information of specific bank, Step S5 further includes: the preset account combination of the specific bank corresponding to the URL, with which, the URL visited by the IE meets the preset vague match condition, is obtained from the white list;

Step S6, the widget waits for receiving information of key entered by the user, and determines whether the key is a number key after the information of key entered by the user is received, if yes, execute Step S7; otherwise, continue to execute Step S6;

Step S7, the widget determines whether the input focus is an input widget, if yes, execute Step S8; otherwise, return to Step S6;

Step S8, the widget obtains the information of key entered by the user from the input widget, determines whether the information of key conforms to the preset account combination, if yes, execute Step S9; otherwise, return to Step S6;

Step S9, the widget prompts that the user is conducting a dangerous operation, and checks whether the user continues the operation, if yes, inform the IE to jump to the user access interface, and return to Step S2; otherwise, prevent the IE from loading the user access interface, and return to Step S2.

Embodiment 2

Figure 2:
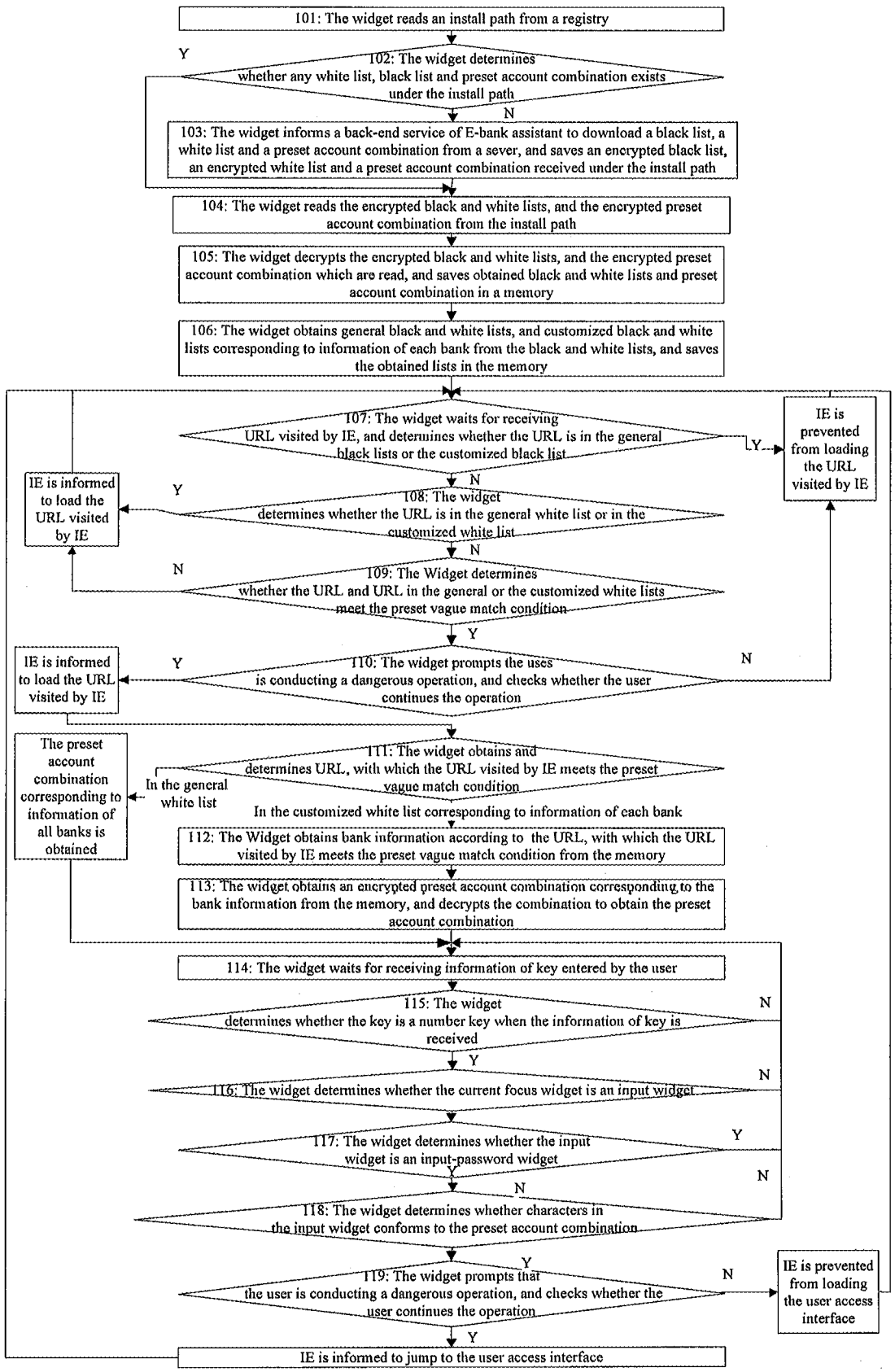
FIG. 2 illustrates a flow chart of another method for realizing anti-phishing in internet according to Embodiment 2 of the present invention.
Figure 3:
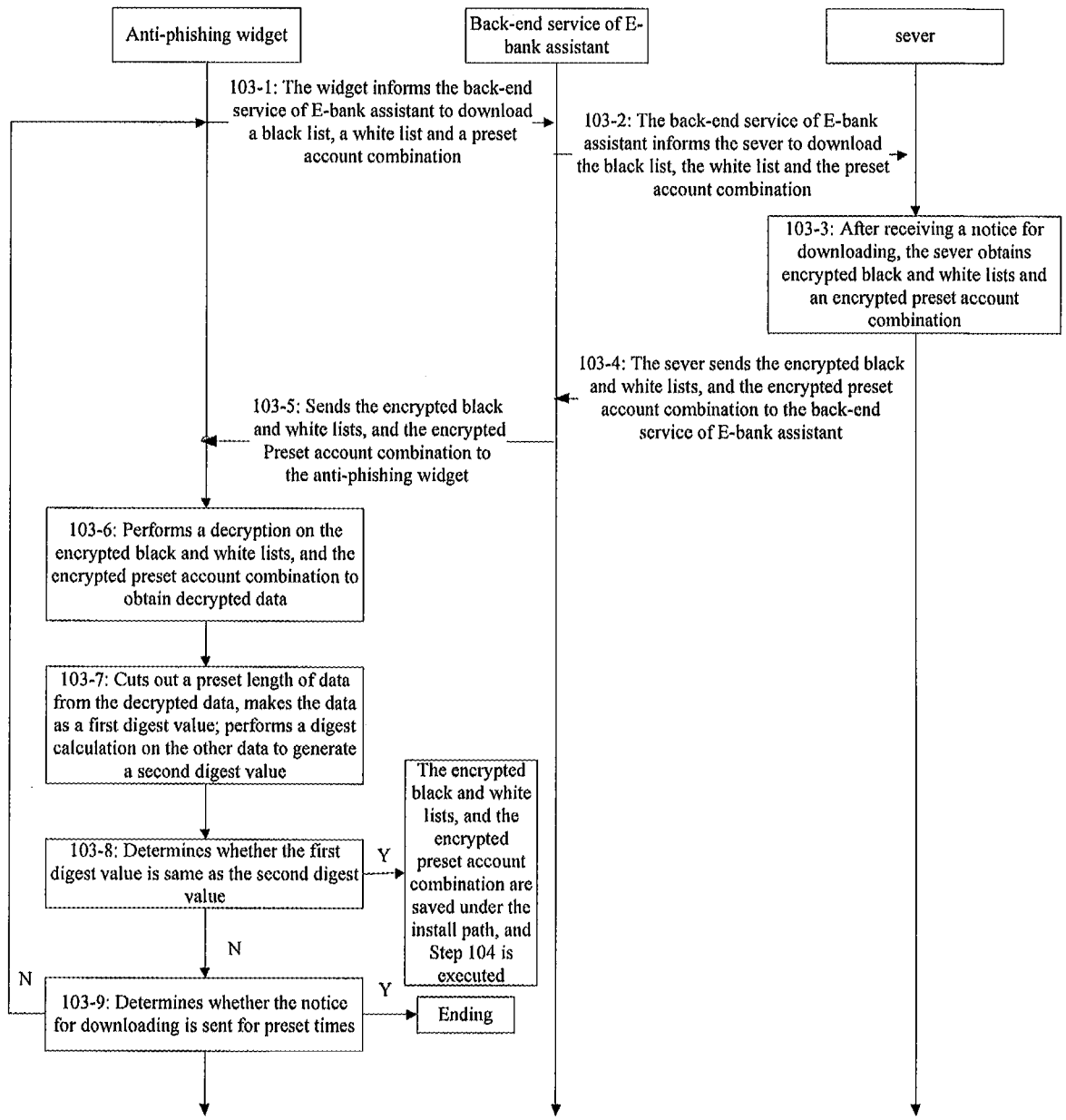
FIG. 3 illustrates a detailed flow chart of Step 103 in Embodiment 2.

Embodiment 2 of the present invention provides a method for realizing anti-phishing in internet, as shown in FIG. 2, which includes: a browser such as an IE is started, an anti-phishing widget is loaded, and the anti-phishing widget (hereinafter anti-phishing widget is called widget for short) executes following steps:

Step 101, the widget reads an install path from a registry;

in the present Embodiment 2, the install path is configured to identify a storage location of an encrypted black list, an encrypted white list and a preset account combination in a memory;

in the present Embodiment 2, a black list, a white list (the black list and the white list can be saved in one file of black and white lists or be saved in a file of black list and a file of white list respectively) and multiple preset account combinations are included under the install path, URL of the black list and URL of the white list include general black and white lists of all banks, and customized black and white lists corresponding to information of each bank; the information of each bank corresponds to one preset account combination;

Step 102, the widget determines whether any black list, white list and preset account combination exist under the install path, if yes, executes Step 104; otherwise, executes Step 103;

Step 103, the widget informs a back-end service of E-bank assistant to download a black list, a white list and a preset account combination from a sever, and saves an encrypted black list, an encrypted white list and an encrypted preset account combination which are received under the install path, and executes Step 104;

in the present Embodiment 2, the sever is informed to download the black list, the white list and the preset account combination after the back-end service of E-bank assistant receives a notice for downloading sent from the anti-phishing widget; when the black list, the white list and the preset account combination have been downloaded, whether the black list, the white list or the preset account combination are manipulated is checked, if yes, continue to inform the sever to download; otherwise, save an encrypted black list, an encrypted white list and a preset account combination under the install path, and execute Step 104;

as shown in FIG. 3, Step 103 specifically includes:

Step 103-1, the widget informs the back-end service of E-bank assistant to download the black list, the white list and the preset account combination;

Step 103-2, the back-end service of E-bank assistant informs the sever to download the black list, the white list and the preset account combination after the notice for downloading is received by the back-end service of E-bank assistant;

Step 103-3, the sever obtains the encrypted black list, the encrypted white list and the encrypted preset account combination after the notice for downloading of the back-end service of E-bank assistant is received by the sever;

in the present Embodiment 2, the sever obtaining the encrypted black list, the encrypted white list and the encrypted preset account combination specifically includes: the black list, the white list and the preset account combination of a plaintext are performed on preset digest calculation via an MD5 digest algorithm to generate a first digest value of 16 bytes, the black list, the white list and the preset account combination of the plaintext are jointed with the first digest value in sequence to obtain a result, the result is encrypted by using RC4 algorithm to obtain the encrypted black list, the encrypted white list and the encrypted preset account combination;

Step 103-4, the sever sends the encrypted black list, the encrypted white list and the encrypted preset account combination to the back-end service of E-bank assistant;

Step 103-5, the back-end service of E-bank assistant sends the encrypted black list, the encrypted white list and the encrypted preset account combination to the widget;

Step 103-6, the widget performs preset decryption on the encrypted black list, the encrypted white list and the encrypted preset account combination after the encrypted black list, the encrypted white list and the encrypted preset account combination are received by the widget to obtain decrypted data.

Preferably, the preset decryption is RC4 decryption;

Step 103-7, the widget cuts out a preset length of data from the decrypted data, and makes the preset length of data as the first digest value, and then performs digest calculation on the other data except for the first digest value in the decrypted data so as to obtain a second digest value.

Preferably, cutting out the preset length of data from the decrypted data specifically is: data at the last 16 bytes are cut out from the decrypted data;

Step 103-8, the widget determines whether the first digest value is same as the second digest value, if yes, the encrypted black and white lists and the encrypted preset account combination are saved under the install path, and Step 104 is executed; otherwise, Step 103-9 is executed;

Step 103-9, the widget determines whether the notice for downloading is sent for preset times, if yes, the process is finished; otherwise, Step 103-1 is executed.

Preferably, the preset times is 3;

Step 104, the widget reads the encrypted black and white lists and the encrypted preset account combination;

in the present Embodiment 2, the anti-phishing widget encrypts the black and white lists and the preset account combination, and saves them under the install path so as to protect them from being malicious manipulated by hackers;

Step 105, the widget decrypts the encrypted black list, the encrypted white list and the encrypted preset account combination which are read, and saves the black list, the white list and the account combination which are obtained by decrypting in the memory;

specifically, the anti-phishing widget decrypts the encrypted black list, the encrypted white list and the encrypted preset account combination via a preset decipher algorithm, preferably, the preset decipher algorithm is RC4 algorithm, besides, the preset decryption may be MD5 algorithm;

in the present Embodiment 2, we take that the black list and the white list are in form of XML as an example, the black list and the white list obtained via decryption are:

```
<?xml version="1.0" encoding="utf-8"?>
<FTCheck>
    <Common>
        <BlackList>
            <WebSite url="http://www.aobchina.cn"></WebSite>
            <WebSite url="http://www.abcihina.cn"></WebSite>
            <WebSite url="http://www.abnchina.cn"></WebSite>
        </BlackList>
    <WhiteList>
        <WebSite url="http://*.tmall.com"></WebSite>
        <WebSite url="https://*.tmall.com"></WebSite>
        <WebSite url="http://*.taobao.com"></WebSite>
        <WebSite url="https://*.taobao.com"></WebSite>
        <WebSite url="http://*.jd.com"></WebSite>
        <WebSite url="https://*.jd.com"></WebSite>
        <WebSite url="http://www.95599.cn"></WebSite>
    </WhiteList>
</Common>
    <ABCBank>
        <BlackList>
            <WebSite url="http://www.abcrchina.cn"></WebSite>
            <WebSite url="http://www.abichina.cn"></WebSite>
            <WebSite url="http://www.abcichina.cn"></WebSite>
        </BlackList>
    <WhiteList>
            <WebSite url="http://*.cmbchina.com"></WebSite>
        </WhiteList>
</ABCBank>
<YTBank>
        <BlackList>
            <WebSite
                url="http://www.yanta1bank.net"></WebSite>
            <WebSite
                url="http://www.yantanbank.net"></WebSite>
            <WebSite
                url="http://www.yantaibank.com"></WebSite>
        </BlackList>
        <WhiteList>
            <WebSite url="http://www.yantaibank.net"></WebSite>
        </WhiteList>
    </YTBank>
</FTCheck>
```

Step 106, the widget obtains the general black list and the general white list, and the customized black list and the customized white list which correspond to information of each bank from the black list and the white list, and save the lists into the memory;

for example, the information obtained from the black list and the white list includes:

A) the customized black list and the customized white list corresponding to information of each bank:

1. Bank information: ABCBank the customized black list corresponding to ABCBank is:

url="http://www.abcrchina.cn"
url="http://www.abichina.cn"
url="http://www.abcichina.cn"

the customized white list corresponding to ABCBank is: url="http://cmbchina.com"

Figure 4:
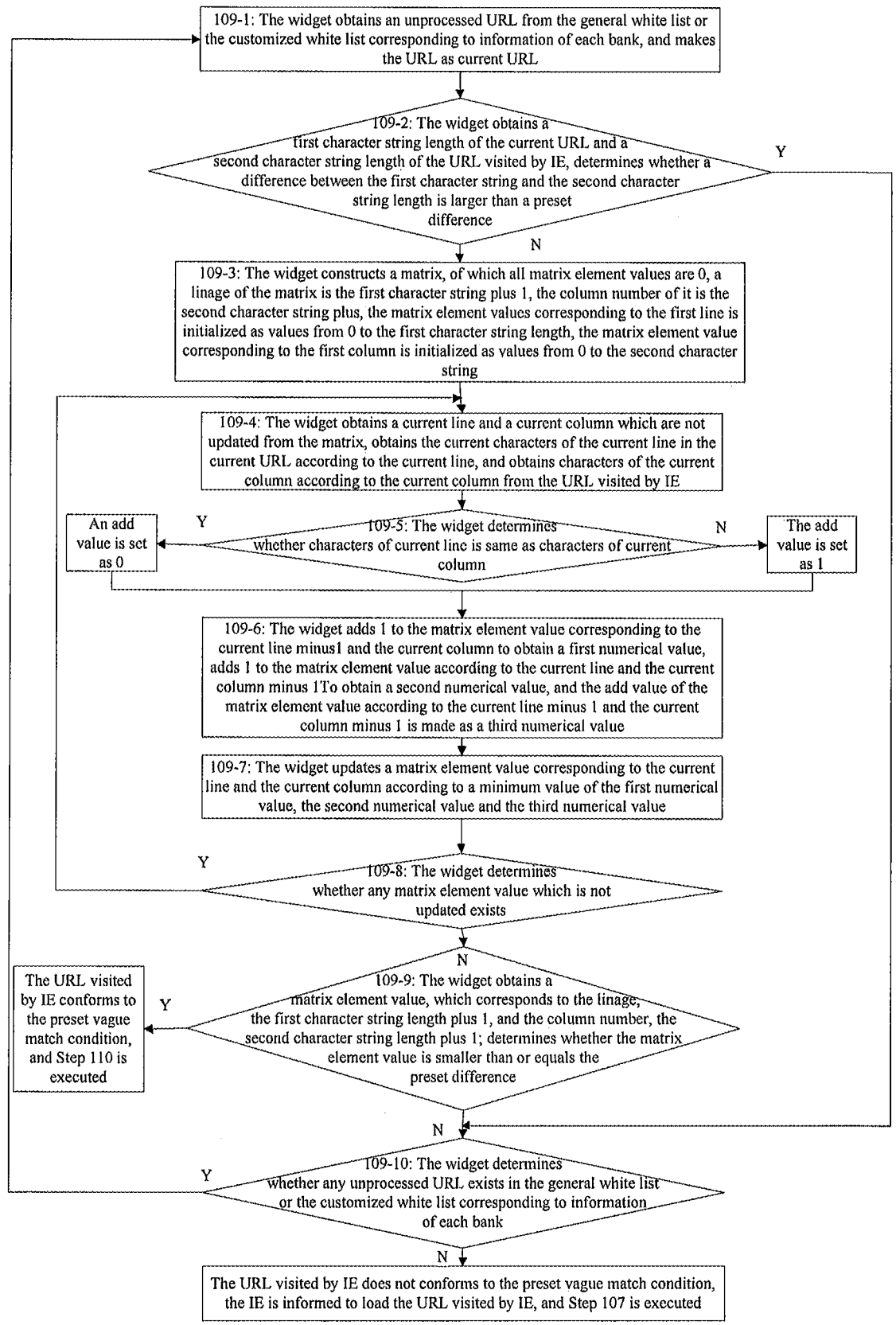
FIG. 4 illustrates a detailed flow chart of Step 109 in Embodiment 2.

2. Bank information: YTBank
   the customized black list corresponding to YTBank is:
   url="http://www.yantalbank.net"
   url="http://www.yantanbank.net"
   url="http://www.yantaibank.com"
   the customized white list corresponding to YTBank is:url=http://www.yantaibank.net B) the general black list obtained from the black list and the white list is:
url="http://www.aobchina.cn"
url="http://www.abcihina.cn"
url="http://www.abnchina.cn"
the general white list obtained from the black list and the white list is:
url="http://*.tmall.com"
url="https://*.tmall.com"
url="http://*.taobao.com"
url="https://*.taobao.com"
url="http://*.jd.com"
url="https://*.jd.com"
url="http://www.95599.cn";

Step 107, the widget waits for receiving URL visited or accessed by the IE, determines whether the URL visited by the IE is in the general black list or in the customized black list corresponding to information of each bank, if yes, IE is prevented from loading the URL visited by the IE, and Step 107 is returned to; otherwise, Step 108 is executed;

in the present Embodiment 2, after the anti-phishing widget is loaded, the IE is binding to message mapping; the anti-phishing widget obtains the URL visited by the IE via the message mapping before the URL visited by the IE is loaded or after the URL visited by the IE is loaded;

in which, URL (Uniform Resource Locator) is a uniform resource locator flag of WWW, which is a network address; preventing the IE from loading the URL visited by the IE specifically may be exiting from a label page corresponding to the URL visited by the IE, or may be stopping the label page corresponding to the URL visited by the IE and displaying an blank page;

in the present Embodiment 2, the URL visited by the IE received by the anti-phishing widget may be URL entered by a user in the url input field or may be URL which pops up;

for instance, the URL visited by the IE received by the anti-phishing widget is "http://www.aobchina.cn-" which can be found in the general black list;

for instance, the URL visited by the IE received by the anti-phishing widget is "http://www.baidu.com" which cannot be found in the general black list or the customized black list, and Step 108 is executed;

Step 108, the widget determines whether the URL visited by the IE is in the general white list or the customized white list corresponding to information of each bank, if yes, the IE is notified to download the URL visited by the IE, and Step 107 is returned to; otherwise, Step 109 is executed;

for instance, the URL visited by the IE received by the anti-phishing widget is "https://www.taobao.com", the URL visited by the IE is matched with URL in the white list, a URL which can be matched with the URL visited by the IE can be found in the white list, that is "https://*.taobao.com", when * is matched, that * is matched means all of the URL is matched, which means characters between "//" and "." do not need to be matched, thus, the IE is informed to download the URL visited by the IE, for example, the URL visited by the IE received by the anti-phishing widget is "http://www.baidu.com" which cannot be found in the white list, and Step 109 is executed;

in the present Embodiment 2, there is no sequence between Step 107 and Step 108, which can be executed at the same time;

Step 109, the widget determines whether the URL visited by the IE and URL in the general white list meet the preset vague match condition or the URL visited by the IE and URL in the customized white list corresponding to information of each bank meet the preset vague match condition, if yes, execute Step 110; otherwise, inform the IE to load the URL visited by the IF, and return to Step 107;

in which, determining whether the URL visited by the IE and URL in the general white list meet the preset vague match condition or the URL visited by the IE and URL in the customized white list corresponding to information of each bank meet the preset vague match condition specifically includes: determine whether difference of characters between the URL visited by the IE and the URL in the general white list or in the customized white list corresponding information of each bank isn't greater than a preset difference, if yes, they meet the preset vague match condition, and Step 110 is executed; otherwise, they does not meet the preset vague match condition, and inform the IE to load the URL visited by the IF, and return to Step 107; preferably, the preset difference is 2;

preferably, the difference of characters between the two character strings is obtained by using matrix, and determining whether the URL visited by the IE and the URL in the general white list or in the customized white list corresponding to information of each bank meet the preset vague match condition, as shown in FIG. 4, specifically includes:

Step 109-1, the widget obtains an unprocessed URL from the general white list or the customized white list corresponding to information of each bank, and makes the unprocessed URL as current URL; for example, the first URL in the white list is http://cmbchina.com, and the URL entered is http://camdchina.com;

Step 109-2, the widget obtains a first character string length of the current URL and a second character string length of the URL visited by the IF, and determines whether the difference between the first character string length and the second character string length is greater than a preset difference, if yes, execute Step 109-10; otherwise, execute Step 109-3.

Preferably, the preset difference is 2;

for instance, the first character string length of the current URL is 19, and the second character string length of the URL visited by the IE is 20;

Step 109-3, the widget constructs a matrix, of which the linage is the first character string length plus 1, the column number is the second character string length plus 1 and all matrix element values are 0; the matrix element values corresponding to the first line of the matrix are initialized as values from 0 to the first character string length, and the matrix element values corresponding to the first column of the matrix are initialized as values from 0 to the second character string length;

for instance, the matrix obtained after the process in Step 109-3 is:

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|----|----|----|----|----|----|----|----|----|----|
| 1 | 0 | 0 | 0 | 0 | 0 | 0 | 0 | 0 | 0 | 0 | 0  | 0  | 0  | 0  | 0  | 0  | 0  | 0  | 0  | 0  |
| 2 | 0 | 0 | 0 | 0 | 0 | 0 | 0 | 0 | 0 | 0 | 0  | 0  | 0  | 0  | 0  | 0  | 0  | 0  | 0  | 0  |
| 3 | 0 | 0 | 0 | 0 | 0 | 0 | 0 | 0 | 0 | 0 | 0  | 0  | 0  | 0  | 0  | 0  | 0  | 0  | 0  | 0  |

-continued

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 4 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |

Step 109-4, the widget obtains a current line and a current column which are not updated from the matrix, and obtains corresponding character of current line in the current URL according to the current line, and obtains corresponding characters of current column in the current URL according to the current column;

in the present Embodiment 2, obtaining the corresponding character of current line in the current URL according to the current line specifically is: character of current line corresponding to the current line minus 1 is obtained from the current URL;

for instance, the current line, which has not been updated, obtained from the matrix is the second line, the value obtained by subtracting 1 from the current line is 1, the corresponding character of line obtained from the current URL is the first character, i.e. the character of current line is h;

in the present Embodiment 2, obtaining the corresponding character of current column in the URL visited by the IE according to the current column specifically is: the character of current column corresponding to the current column minus 1 is obtained from the URL visited by the IE;

for instance, the current column, which has not been updated, obtained from the matrix is the second column, the value obtained by subtracting 1 from the current column is 1, the corresponding character of column obtained from the current URL is the first character, i.e. the character of current column is h;

Step 109-5, the widget determines whether the character of current line is same with the character of current column, if yes, an add value is set as 0, and Step 109-6 is executed; otherwise, the add value is set as 1, and Step 109-6 is executed;

for instance, if the character of current line is h and the character of current column is h, the add value is set as 0;

Step 109-6, the widget adds 1 to a matrix element value corresponding to the current line minus 1 and the current column to obtain a value which is made as a first numerical value, adds 1 to a matrix element value corresponding to the current line and the current column minus 1 to obtain a value which is made as a second numerical value, and obtains an add value of the matrix element value which corresponds to the current line minus 1 and the current column minus 1 to make the add value as a third numerical value;

for instance, the matrix element value corresponding to the first line and the second column is 1 in the case that the add value is 0, thus, the first numerical value is 1+1=2; the matrix element value corresponding to the second line and the first column is 1, thus the second numerical is 1+1=2; the matrix element corresponding the first line and the first column is 0, the matrix element plus the add value 0 to obtain the third numerical value 0;

Step 109-7, the widget updates a matrix element value corresponding to the current line and the current column according to a minimum value of the first numerical value, the second numerical value and the third numerical value;

for instance, the first numerical value is 2, the second numerical value is 2, and the third numerical value is 0, the minimum value of them is the third numerical value 0, thus, the matrix element value corresponding to the second line and the second column is updated as 0;

Step 109-8, the widget determines whether any matrix element value which is not updated exists, if yes, Step 109-4 is executed; otherwise, Step 109-9 is executed;

in the present Embodiment 2, the matrix which is obtained after steps from Step 109-3 to Step 109-8 is:

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 | 18 |
| 2 | 1 | 0 | 1 | 2 | 3 | 4 | 5 | 6 | 7 | 8 | 9 | 10 | 11 | 12 | 13 | 14 | 15 | 16 | 17 |
| 3 | 2 | 1 | 0 | 1 | 2 | 3 | 4 | 5 | 6 | 7 | 8 | 9 | 10 | 11 | 12 | 13 | 14 | 15 | 16 |
| 4 | 3 | 2 | 1 | 0 | 1 | 2 | 3 | 4 | 5 | 6 | 7 | 8 | 9 | 10 | 11 | 12 | 13 | 14 | 15 |
| 5 | 4 | 3 | 2 | 1 | 0 | 1 | 2 | 3 | 4 | 5 | 6 | 7 | 8 | 9 | 10 | 11 | 12 | 13 | 14 |
| 6 | 5 | 4 | 3 | 2 | 1 | 0 | 1 | 2 | 3 | 4 | 5 | 6 | 7 | 8 | 9 | 10 | 11 | 12 | 13 |
| 7 | 6 | 5 | 4 | 3 | 2 | 1 | 0 | 1 | 2 | 3 | 4 | 5 | 6 | 7 | 8 | 9 | 10 | 11 | 12 |
| 8 | 7 | 6 | 5 | 4 | 3 | 2 | 1 | 0 | 1 | 2 | 3 | 4 | 5 | 6 | 7 | 8 | 9 | 10 | 11 |
| 9 | 8 | 7 | 6 | 5 | 4 | 3 | 2 | 1 | 1 | 2 | 3 | 4 | 5 | 6 | 6 | 7 | 8 | 9 | 10 |
| 10 | 9 | 8 | 7 | 6 | 5 | 4 | 3 | 2 | 1 | 2 | 3 | 4 | 5 | 6 | 7 | 8 | 9 | 10 | 9 |

-continued

| | | | | | | | | | | | | | | | | | | | | |
|---|---|---|---|---|---|---|---|---|---|---|---|---|---|---|---|---|---|---|---|---|
| 11 | 10 | 9  | 8  | 7  | 6  | 5  | 4  | 3  | 2  | 2  | 1  | 4  | 5  | 6  | 7  | 8  | 9  | 10 | 11 | |
| 12 | 11 | 10 | 9  | 8  | 7  | 6  | 5  | 4  | 3  | 3  | 2  | 3  | 4  | 5  | 6  | 7  | 8  | 9  | 10 | |
| 13 | 12 | 11 | 10 | 9  | 8  | 7  | 6  | 5  | 4  | 4  | 3  | 2  | 3  | 4  | 5  | 6  | 7  | 8  | 9  | |
| 14 | 13 | 12 | 11 | 10 | 9  | 8  | 7  | 6  | 5  | 5  | 4  | 3  | 2  | 3  | 4  | 5  | 6  | 7  | 8  | |
| 15 | 14 | 13 | 12 | 11 | 10 | 9  | 8  | 7  | 6  | 6  | 5  | 4  | 3  | 2  | 3  | 4  | 5  | 6  | 7  | |
| 16 | 15 | 14 | 13 | 12 | 11 | 10 | 9  | 8  | 7  | 7  | 6  | 5  | 4  | 3  | 2  | 3  | 4  | 5  | 6  | |
| 17 | 16 | 15 | 14 | 13 | 12 | 11 | 10 | 9  | 8  | 8  | 7  | 6  | 5  | 4  | 3  | 2  | 3  | 4  | 5  | |
| 18 | 17 | 16 | 15 | 14 | 13 | 12 | 11 | 10 | 9  | 9  | 8  | 7  | 6  | 5  | 4  | 3  | 2  | 3  | 4  | |
| 19 | 18 | 17 | 16 | 15 | 14 | 13 | 12 | 11 | 10 | 10 | 9  | 8  | 7  | 6  | 5  | 4  | 3  | 2  | 3  | |
| 20 | 19 | 18 | 17 | 16 | 15 | 14 | 13 | 12 | 11 | 11 | 10 | 9  | 8  | 7  | 6  | 5  | 4  | 3  | 2  | |

Step 109-9, the widget obtains a matrix element value corresponding to a line, of which the linage is obtained by adding 1 to the first character string length, and a column, of which the column number is obtained by adding 1 to the second character string length; and determines whether the matrix element value is smaller than a preset difference, if yes, the URL visited by the IE meets the preset vague match condition, and Step 110 is executed; otherwise, Step 109-10 is executed;

for instance, the linage is 19+1=20 if the first character string length is 19, the column number is 20+1=21 if the second character string length is 20, thus the matrix element value corresponding to the 20th line and the 20th column is 2 which equals the preset difference 2, so the URL visited by the IE meets the preset vague match condition, and Step 110 is executed;

Step 109-10, the widget determines whether any unprocessed URL exists in the general white list or the customized white list corresponding to information of each bank, if yes, return to execute Step 109-1; otherwise, the URL visited by the IE does not meet the preset vague match condition, the IE is informed to load the URL visited by the IF, and Step 107 is returned to;

in the preset Embodiment 2, the URL visited by the IE may be URL which is manipulated by a hacker who counterfeits URL in the general white list or the customized white list corresponding to information of each bank, if the URL visited by the IE meets the preset vague match condition, thus, that the user is conducting a dangerous operation is prompted, and then the user can manage the operation;

in the present Embodiment 2, the difference between the first character string and the second character string is 5, which is greater than 2, in the case that the received URL is http://www.baidu.com and the current URL is https://www.taobao.com, thus, the URL does meet the preset vague match condition, the widget informs the IE to load the URL visited by the IE directly, the IE loads the URL visited by the IE to enter Baidu and finishes loading Baidu;

Step 110, the widget prompts that the user is conducting a dangerous operation and checks whether the user continues the operation, if yes, the IE is informed to load the URL visited by the IE, and Step 111 is executed; otherwise, the IE is prevented from loading the URL visited by the IE, and Step 107 is returned;

in the present Embodiment 2, that the IE is prevented from loading the URL visited by the IE specifically includes: a label page corresponding to the URL visited by the IE is exited from or the label page corresponding the URL visited by the IE is loaded as a blank page;

furthermore, after the widget prevents URL visited by the IE in the case that the user does not continue, the process further includes: the URL visited by the IE is saved into the black list, and the widget informs the back-end service of E-bank assistant to send the URL visited by the IE to the sever, and the sever checks the number of the URL visited by the IE manually after a preset duration; when the number of the URL visited by the IE reaches a preset number, the URL visited by the IE is saved into the encrypted black list and the encrypted white list of the sever;

the step that prompt the user is conducting a dangerous operation and check whether the user continues the operation further includes: determine whether any user's choice is detected, if yes, check whether the user continue the operation; otherwise, the IE is prevented from loading the URL visited by the IE, and Step 107 is returned to;

Step 111, the widget obtains and determines a URL, with which the URL visited by the IE meets the preset vague match condition, the preset account combination corresponding to information of all banks is obtained and Step 114 is executed if the URL is a URL in the white list; Step 112 is executed if the URL is a URL in the customized white list corresponding to information of each bank;

for instance, the URL visited by the IE is https://www.t-mall.com, which is the same as the URL in the general white list, the preset account combination corresponding to information of all banks saved in the memory are obtained;

Step 112, the widget obtains bank information corresponding to the URL, with which the URL visited by the IE meets the preset vague match condition, from the memory;

for example, the URL entered is http://camdchina.com, and the URL, with which the URL visited by the IE meets the preset vague match condition, is http://cmbchina.com, the corresponding bank information is ABCBank;

Step 113, the widget obtains an encrypted preset account combination corresponding to the bank information from the memory, and decrypts the encrypted preset account combination to obtain the preset account combination.

Preferably, the preset account combination is saved in the form, of regular expression, in which, the regular expression is started with ^, and ended with $; for example, ^622825\d{13}$, a regular expression, means that ^ is a start, and behind it is a fixed value 622825, behind the fixed value is numbers of 13 bits, and then $ is an end;

in the present Embodiment 2, decrypting the encrypted preset account combination to obtain the preset account combination specifically is realized in such a way that the encrypted preset account combination is decrypted via a preset decipher algorithm, preferably, the preset decipher algorithm is RC4 algorithm, additionally, the preset decipher algorithm may be MD5 algorithm, etc.;

for example, the obtained preset account combination is:
^622825\d{13}$
^622826\d{13}$
^622827\d{13}$
^491025\d{10}$
^491027\d{10}$
^491028\d{10}$
^491029\d{10}$
. . .

Step 114, the widget waits for receiving information of key entered by the user;

Step 115, the widget determines whether the key is a number key after the information entered by the user is received, if yes, Step 116 is executed; otherwise, continue to execute Step 114;

in the present Embodiment 2, the anti-phishing widget needs to monitor account information, the numbers received need to be processed if the key is the number key; if the preset account combination is conformed to, that the user is conducting a dangerous operation is prompted, in this way, the anti-phishing is safer;

Step 116, the widget determines whether a current focus widget is an input widget, if yes, Step 117 is executed; otherwise, Step 114 is executed;

in the present Embodiment 2, the current focus widgets are widgets clicked by a mouse, which include: an input widget, a button widget, a Radio Button widget and a Check Box widget, etc., in which, the input widget includes an input-account widget and an input-password widget, etc.;

Step 117, the widget determines whether the input widget is the input-password widget, if yes, execute Step 114; otherwise, execute Step 118;

Step 118, the widget determines whether characters in the input widget conform to the preset account combination, if yes, execute Step 119; otherwise, continue to execute Step 114;

for instance, the characters received by the anti-phishing widget from the input widget are numbers which are 6228 2700 0101 0202 030, and the numbers meet the preset account combination, Step 119 is executed;

Step 119, the widget prompts the user is conducting a dangerous operation, and checks whether the user continue the operation, if yes, the IE is informed to jump to the user access interface, and Step 107 is returned; otherwise, the IE is prevented from loading the user access interface, and Step 107 is returned to;

in the present Embodiment 2, the URL is a website trusted by the user if the user continues the operation, thus, the URL visited by the IE is saved in the local white list;

in the present Embodiment 2, in the case that the characters in the input box received by the anti-phishing widget are numbers and conform to the preset account combination, the characters entered by the user may be an account, it is needed to prompt the user that the URL may be dangerous and wait for a determination from the user if the URL is not in the white list;

in which, prompting that the user is conducting a dangerous operation, and checking whether the user continues the operation further includes: determine whether any user's choice is detected in the preset duration, if yes, check whether the user continues the operation; otherwise, the IE is prevented from loading the user access interface, and Step 107 is returned to.

Embodiment 3

Figure 5:
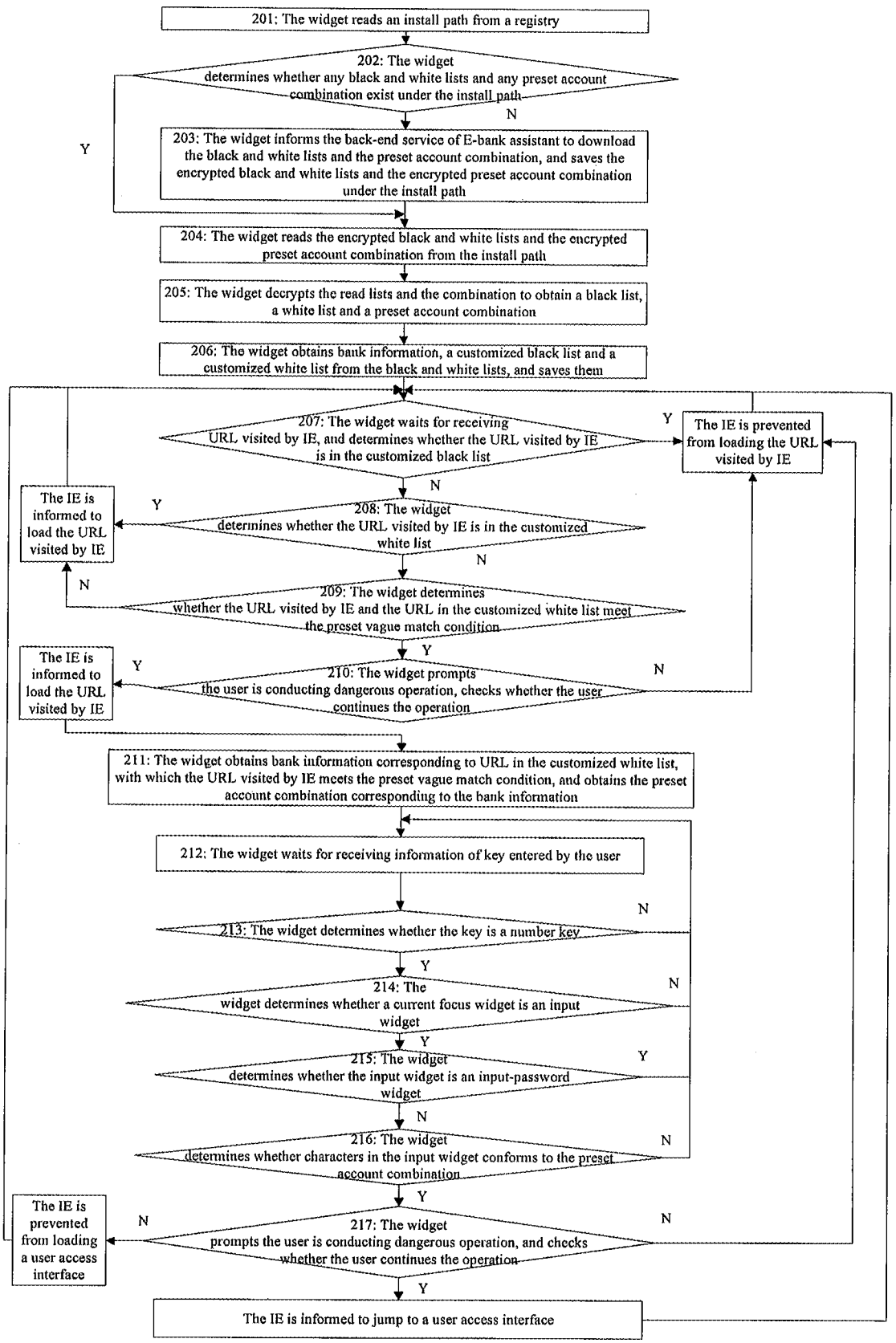
FIG. 5 illustrates a flow chart of the third method for realizing anti-phishing in internet according to Embodiment 3 of the present invention.

The present Embodiment 3 provides a method for realizing anti-phishing in internet, as shown in FIG. 5, the method includes: an IE, an example of browser, is started, an anti-phishing widget is loaded, in which the anti-phishing widget executes (hereinafter the anti-phishing widget is called as widget for short) following steps:

Step 201, the widget reads an install path from a registry;

in which, the install path is configured to identify storage locations of an encrypted black list, an encrypted white list and an encrypted preset account combination in a memory;

in the present Embodiment 3, the install path includes a black list, a white list and a preset account combination; and URL data in the black list and the white list is black and white lists of a specific bank, information of the specific bank corresponds one preset account combination;

Step 202, the widget determines whether any black list, white list or preset account combination exist under the install path, if yes, Step 204 is executed; otherwise, Step 203 is executed;

Step 203, the widget informs a back-end service of E-bank assistant to download a black list, a white list and a preset account combination from a sever, and an encrypted black list, an encrypted white list and an encrypted preset account combination, which are received, are saved under the install path, and Step 204 is executed.

In the present Embodiment 3, operation in Step 203 is same as the operation in Step 103 in Embodiment 1, no more details need to be given herein;

Step 204, the widget reads the encrypted black list, the encrypted white list and the encrypted preset account combination from the install path;

Step 205, the widget decrypts the encrypted black list, the encrypted white list and the encrypted preset account combination which are read to obtain the black list, the white list and the preset account combination;

specifically, the widget decrypts the encrypted black list, the encrypted white list and the encrypted preset account combination via a preset decipher algorithm, preferably, the preset decipher algorithm is RC4 algorithm, additionally, the preset decipher algorithm may be MD5 algorithm, etc.;

in the present Embodiment 3, for example, if the black list and the white list are XML files, the black list and the white list obtained by the anti-phishing widget are:

```
<?xml version="1.0" encoding="utf-8"?>
<FTCheck>
  <ABCBank>
    <BlackList>
      <WebSite url="http://www.abcrchina.cn"></WebSite>
      <WebSite url="http://www.abichina.cn"></WebSite>
      <WebSite url="http://www.abcichina.cn"></WebSite>
    </BlackList>
    <WhiteList>
      <WebSite url="http://*.cmbchina.com"></WebSite>
    </WhiteList>
  </ABCBank>
</FTCheck>
```

Step 206, the widget obtains bank information, a customized black list and a customized white list from the black list and the white list, and saves them into the memory;

for example, the customized black list obtained from the black list and the white list is:
url="http://www.abcrchina.cn"
url="http://www.abichina.cn"
url="http://www.abcichina.cn"
the customized white list obtained from the black list and the white list is:
url="http://cmbchina.com"

Step 207, the widget waits for receiving URL visited or accessed by the IE, and determines whether the URL is in the customized black list, if yes, the URL visited by the IE is prevented from being loaded by the IF, and Step 207 is returned to; otherwise, Step 208 is executed;

for example, the URL visited by the IE received by the widget is "http://www.abcrchina.cn" which can be found in the black list;

Step 208, the widget determines whether the URL visited by the IE is in the customized white list, if yes, the IE is informed to load the URL visited by the IF, and Step 207 is returned to; otherwise, Step 209 is executed;

for example, the URL visited by the IE received by the widget is "http://cmbchina.com" which can be found in the customized white list, thus, the IE is informed to load the URL visited by the IE;

Step 209, the widget determines whether the URL visited by the IE and URL in the customized white list meet a preset vague match condition, if yes, Step 210 is executed; otherwise, the IE is informed to load the URL visited by the IE, and Step 207 is returned to;

in the present Embodiment 3, the operation in Step 209 is same as the operation in Step 109 in Embodiment 1, no more details need to be given herein;

for example, the URL visited by the IE is http://camdchina.com, with which the URL, http://cmbchina.com, in the white list meets the preset vague match condition, because difference of characters between the two URL is 2;

Step 210, the widget prompts that the user is conducting a dangerous operation, and checks whether the user continues the operation, if yes, the IE is informed to load the URL visited by the IF, and Step 211 is executed; otherwise, the IE is prevented from loading the URL visited by the IF, and Step 207 is returned to;

Step 211, the widget obtains bank information corresponding to the URL in the white list, with which the URL visited by the IE meets the preset vague match condition, and obtains the preset account combination corresponding to the bank information;

in the present Embodiment 3, Step 204 and Step 205 may also be performed in such a way that the encrypted black list and the encrypted white list are obtained from the install path, and the encrypted black list and the encrypted white list are decrypted to obtain the black list and the white list; correspondingly, Step 211 specifically includes: the bank information corresponding to the URL, with which the URL visited by the IE meets the preset vague match condition, in the customized white list is obtained, the encrypted preset account combination corresponding to the bank information is obtained, and the encrypted preset account combination is decrypted to obtain the preset account combination;

in the present Embodiment 3, the preset account combination obtained by the widget is:

^622825\d{13}$
^622826\d{13}$
^622827\d{13}$
^491025\d{10}$
^491027\d{10}$
^491028\d{10}$
^491029\d{10}$
. . .

Step 212, the widget waits for receiving information of key entered by the user;

Step 213, the widget determines whether the key received is a number key when the information of key entered by the user is received by the widget, if yes, Step 214 is executed; otherwise, Step 212 is returned to;

Step 214, the widget determines whether a current focus widget is an input widget, if yes, Step 215 is executed; otherwise, Step 212 is returned to;

Step 215, the widget determines whether the input widget is an input-password widget, if yes, Step 212 is executed; otherwise, Step 216 is executed;

Step 216, the widget determines whether characters in the input widget conform to the preset account combination, if yes, Step 217 is executed; otherwise, Step 212 is returned to;

for example, if the characters in the input widget received by the anti-phishing widget is numbers which is 6228 2700 0101 0202 030, the characters meet the preset account combination;

Step 217, the widget prompts that the user is conducting a dangerous operation, and checks whether the user prefers to continue the operation, if yes, the IE is informed to jump to the user access interface, and Step 207 is returned to; otherwise, the IE is prevented from loading the user access interface, and Step 207 is returned to.

In the present Embodiment 3, the URL is a trusted website if the user continues the operation, thus, the URL is saved in a local white list;

in which, prompting that the user is conducting a dangerous operation, and checking whether the user continues the operation further includes: whether any user's choice is detected in a preset duration is determined, if yes, whether the user continues the operation is checked; otherwise, the IE is prevented from loading the user access interface.

Embodiment 1 in the present invention applies for operations of all banks, while Embodiment 2 in the present invention applies for operations of specific banks, but the core technologies in Embodiment 1 and in Embodiment 2 are the same as each other, which have same advantages.

While the preferred Embodiments of the present invention have been shown and described herein, it will be obvious for those skilled in the art that such Embodiments are provided by way of examples only. Any changes and substitutions will be covered by the scope of protection of the present invention. It is intended that the appended claims define the scope of protection of the present invention.

The invention claimed is:

1. A method for anti-phishing in internet, wherein said method comprises: starting a browser and loading an anti-phishing widget, in which the anti-phishing widget executes the following steps:

Step S1, obtaining, by the anti-phishing widget, a black list and a white list;

Step S2, waiting, by the anti-phishing widget, for receiving a Uniform Resource Locator (URL) visited by the browser, and determining the URL visited by the browser, preventing the browser from loading the URL visited by the browser and returning to Step S2 in the case that the URL visited by the browser is in the black list; prompting the browser to load the URL visited by the browser and return to S2 in the case that the URL visited by the browser is in the white list; and executing Step S3 in the case that the URL visited by the browser is neither in the black list nor in the white list;

Step S3, determining, by the anti-phishing widget, whether the URL visited by the browser and the URL in the white list meet a preset vague match condition, if yes, executing Step S4; otherwise, informing the browser to load the URL visited by the browser, and return to Step S2;

Step S4, prompting, by the anti-phishing widget, that a user is conducting a dangerous operation, checking whether the user prefers to continue the operation, if yes, informing the browser to load the URL visited by the browser, and executing Step S5; otherwise, preventing the browser from loading the URL visited by the browser, and returning to Step S2;

Step S5, obtaining from the white list, by the anti-phishing widget, a preset account combination corresponding to URL visited by the browser, which meets the preset vague match condition;

Step S6, waiting, by the anti-phishing widget, for receiving information of key entered by the user, determining whether the key is a number key when the information of key is entered by the user, if yes, executing Step S7; otherwise, continuing to execute Step S6;

Step S7, determining, by the anti-phishing widget, whether an input focus is an input widget, if yes, executing Step S8; otherwise, returning to Step S6;

Step S8, obtaining, by the anti-phishing widget, the information of key entered by the user in the input widget, and determining whether the information of key conforms to the preset account combination, if yes, executing Step S9; otherwise, returning to Step S6; and Step S9, prompting, by the anti-phishing widget, that the user is conducting a dangerous operation, and checking whether the user prefers to continue the operation, if yes, informing the browser to jump to a user access interface, and returning to Step S2; otherwise, preventing the browser from loading the user access interface, and returning to Step S2.

2. The method as claimed in claim 1, wherein Step S1 specifically comprises: reading, by the anti-phishing widget, an install path from a registry, obtaining the black list, the white list and the preset account combination from the install path, and saving them.

3. The method as claimed in claim 2, wherein Step S1 further comprises:

Step a1, determining, by the anti-phishing widget, whether any black list, white list and preset account combination exists under the install path, if yes, obtaining the black list, the white list and the preset account combination from the install path and saving them, and executing Step S2; otherwise, executing Step a2; and Step a2, informing, by the anti-phishing widget, a back-end service of E-bank assistant to download the black list, the white list and the preset account combination from a sever, and saving the black list, the white list and the preset account combination under the install path, and executing Step S2.

4. The method as claimed in claim 3, wherein Step a1 may also be: determining, by the anti-phishing widget, whether the black list, the white list and the preset account combination under the install path need to be updated, if yes, executing Step a2; otherwise, obtaining the black list, the white list and the preset account combination from the install path, and saving them, and executing Step S2.

5. The method as claimed in claim 3, wherein Step a1 may also be: determining, by the anti-phishing widget, whether the black list, the white list and the preset account combination under the install path are interpolated, if yes, executing Step a2; otherwise, obtaining the black list, the white list and the preset account combination from the install path and saving them, and executing Step S2.

6. The method as claimed in claim 3, wherein Step a2 specifically comprises:

Step b1, informing, by the anti-phishing widget, the back-end service of E-bank assistant to download the black list, the white list and the preset account combination from the sever;

Step b2, notifying, by the back-end service of E-bank assistant, the sever to download the black list, the white list and the preset account combination after a notice for downloading sent by the anti-phishing widget is received by the back-end service of E-bank assistant;

Step b3, obtaining, by the sever, an encrypted black list, an encrypted white list and an encrypted preset account combination after a notice for downloading sent by the back-end service of E-bank assistant is received by the sever, and sending them to the back-end service of E-bank assistant;

Step b4, sending, by the back-end service of E-bank assistant, the encrypted black list, the encrypted white list and the encrypted preset account combination to the anti-phishing widget;

Step b5, performing, by the anti-phishing widget, a preset decryption on the encrypted black list, the encrypted white list and the encrypted preset account combination after the encrypted black list, the encrypted white list and the encrypted preset account combination are received by the anti-phishing widget, so as to obtain decrypted data;

Step b6, cutting out, by the anti-phishing widget, a preset length of data from the decrypted data and making the preset length of data as a first digest value, and performing a digest algorithm on the other data remained in the decrypted data except the first digest value, so as to generate a second digest value;

Step b7, determining, by the anti-phishing widget, whether the first digest value equals the second digest value, if yes, saving the encrypted black list, the encrypted white list and the encrypted preset account combination under the install path, and executing Step S2; otherwise, executing Step b8; and Step b8, determining, by the anti-phishing widget, whether the notice for downloading has been sent for preset times, if yes, ending the process; otherwise, executing Step b1;

obtaining the black list, the white list and the preset account combination from the install path and saving them specifically comprising: obtaining the encrypted black list, the encrypted white list and the encrypted preset account combination from the install path, decrypting the encrypted black list, the encrypted white list and the encrypted preset account combination, so as to obtain the black list, the white list and the preset account combination, and saving them.

7. The method as claimed in claim 1, wherein

Step S1 specifically comprises: obtaining, by the anti-phishing widget, a general black list, a general white list, a customized white list and a customized black list corresponding to information of each bank;

Step S2 specifically comprises: waiting, by the anti-phishing widget, for receiving URL visited by the browser, and determining the URL visited by the browser, preventing the browser from loading the URL visited by the browser in the case that the URL visited by the browser is in the general black list or in the customized black list corresponding to the information of each bank, and returning to Step S2; informing the browser to loading the URL visited by the browser in the case that the URL visited by the browser is in the general white list or in the customized white list corresponding to the information of each bank, and returning to Step S2; otherwise, executing Step S3;

in Step S4, in the case that the user prefers to continue the operation after the anti-phishing widget prompts that the user is conducting a dangerous operation, after informing the browser to load the URL visited by the browser, the method further comprises: obtaining and determining the URL, by the anti-phishing widget, which meets the preset vague match condition from the white list; obtaining a preset account combination corresponding to information of all banks in the case that the URL is in the general white list, and executing Step S6; executing Step S5 in the case that the URL is in the customized white list corresponding to information of any bank; and Step S5 specifically comprises: obtaining, by the anti-phishing widget, the bank information corresponding to the URL in the white list, which meets the preset vague match condition, from a memory, so as to obtain the preset account combination corresponding to the bank information.

8. The method as claimed in claim 1, wherein,

Step S1 specifically comprises: obtaining, by the anti-phishing widget, the customized white list and the customized black list;

Step S2 specifically comprises: waiting, by the anti-phishing widget, for receiving URL visited by the browser and determining the URL visited by the browser, preventing the browser from loading the URL visited by the browser in the case that the URL visited by the browser is in the customized black list, and returning to Step S2; informing the browser to loading the URL visited by the browser in the case that the URL visited by the browser is in the customized white list, and returning to Step S2; otherwise, executing Step S3; and Step S5 specifically comprises: obtaining, by the anti-phishing widget, the bank information corresponding to the URL in the customized white list, which meets the preset vague match condition, so as to obtain a preset account combination corresponding to the bank information.

9. The method as claimed in claim 1, wherein, preventing the browser from loading the URL visited by the browser specifically comprises: turning down, by the anti-phishing widget, a label page corresponding to the URL visited by the browser or setting the label page corresponding to the URL visited by the browser as a blank page.

10. The method as claimed in claim 1, wherein Step S6 specifically comprises: determining whether a number of different characters between the URL visited by the browser and the URL in the white list is not greater than a preset difference, if yes, the URL visited by the browser and the URL in white list meet the preset vague match condition, and executing Step S4; otherwise, the URL visited by the browser and the URL in white list do not meet the preset vague match condition, informing the browser to load the URL visited by the browser, and returning to Step S2.

11. The method as claimed in claim 10, wherein, determining whether the number of different characters between the URL visited by the browser and the URL in the white list is not greater than the preset difference, specifically comprises:

Step 1, obtaining, by the anti-phishing widget, an unprocessed URL from the white list, and making the unprocessed URL as a current URL;

Step 2, obtaining, by the anti-phishing widget, a first character string length of the current URL and a second character string length of the URL visited by the browser, and determining whether a difference between the first character string length and the second character string length is greater than the preset difference, if yes, executing Step 4; otherwise, executing Step 3;

Step 3, determining, by the anti-phishing widget, whether the number of different characters between the URL visited by the browser and the current URL is not greater than the preset difference, if yes, the URL visited by the browser and the URL in the white list meet the preset vague match condition, and executing Step S4; otherwise, executing Step 4; and Step 4, determining, by the anti-phishing widget, whether any unprocessed URL exists in the white list, if yes, executing Step 1; otherwise, the URL visited by the browser does not meet the preset vague match condition, informing the browser to load the URL visited by the browser, and returning to Step S2.

12. The method as claimed in claim 11, wherein Step 3 specifically comprises:

Step c1, constructing, by the anti-phishing widget, a matrix, of which all matrix element values are 0, a linage of the matrix is the first character string length plus 1, a column number of the matrix is the second character string length plus 1; initializing the matrix element values corresponding to the first line of the matrix as the values from 0 to the first character string length, and initializing the matrix element values corresponding to the first column as the values from 0 to the second character string length;

Step c2, obtaining, by the anti-phishing widget, a current line and a current column which have been not yet updated from the matrix, and obtaining corresponding characters of the current line in the current URL according to the current line, and obtaining corresponding characters of the current column in the current URL according to the current column;

Step c3, determining, by the anti-phishing widget, whether the characters of the current line are same as the characters of the current column, if yes, setting an added value as 0, and executing Step c4; otherwise, setting the added value as 1 and executing Step c4;

Step c4, adding, by the anti-phishing widget, 1 to the matrix element value corresponding to one line above the current line and the current column to obtain a first numerical value; adding 1 to the matrix element value corresponding to the current line and one column left the current column to obtain a second numerical value; and calculating an add value of the matrix element value corresponding to the one line above current line and one column left the current column to obtain a third numerical value;

Step c5, updating, by the anti-phishing widget, the matrix element value corresponding the current line and the current column according to a minimum value selected from the first numerical value, the second numerical value and the third numerical value;

Step c6, determining, by the anti-phishing widget, whether any matrix element value has not yet been updated, if yes, returning to execute Step c4; otherwise, executing Step c7; and Step c7, obtaining, by the anti-phishing widget, a matrix element value corresponding to a linage, which is the first character string length plus 1, and a column, which is the second character string plus 1, and determining whether the matrix element value is smaller than or equals the preset difference, if yes, the URL visited by the browser meets the preset vague match condition, and executing Step S4; otherwise, executing Step 4.

13. The method as claimed in claim 1, wherein, after preventing the browser from loading the URL visited by the browser, the method further comprises: saving, by the anti-phishing widget, the URL visited by the browser into the black list, informing the back-end service of e-bank assistant to send the URL visited by the browser to the sever, and checking, by the sever, the number of the URL visited by the browser after a preset duration, and saving the URL visited by the browser into the encrypted black list and the encrypted white list in the sever when the number of URL visited by the browser reaches a preset value.

14. The method as claimed in claim 1, wherein
- in Step S4, after prompting that the user is conducting a dangerous operation, the method further comprises: determining whether any user's choice is detected in a preset duration, if yes, checking whether the user prefers to continue the operation; if no, preventing the browser from loading the URL visited by the browser, and returning to Step S2; and
- in Step S9, prompting that the user is conducting a dangerous operation, and checking whether the user prefers to continue the operation further comprises: determining whether a user's choice is detected in a preset duration, if yes, checking whether the user prefers to continue the operation; if no, preventing the browser from loading a user access interface, and returning to Step S2.

15. The method as claimed in claim 1, wherein when the input focus is the input widget in Step S7, the method further comprises: determining, by the anti-phishing, whether the input widget is an input password widget, if yes, returning to execute Step S6; otherwise, executing Step S8.

* * * * *